United States Patent
Duccini et al.

(10) Patent No.: US 10,547,457 B1
(45) Date of Patent: Jan. 28, 2020

(54) SYSTEMS AND METHODS FOR NOTARY AGENT FOR PUBLIC KEY INFRASTRUCTURE NAMES

(71) Applicant: Wells Fargo Bank, N.A., San Francisco, CA (US)

(72) Inventors: David V. Duccini, St. Paul, MN (US); Phillip H. Griffin, Raleigh, NC (US); Jeffrey J. Stapleton, Arlington, TX (US)

(73) Assignee: Wells Fargo Bank N.A., San Francisco, CA (US)

( * ) Notice: Subject to any disclaimer, the term of this patent is extended or adjusted under 35 U.S.C. 154(b) by 71 days.

(21) Appl. No.: 15/331,019

(22) Filed: Oct. 21, 2016

(51) Int. Cl.
| | |
|---|---|
| H04L 9/32 | (2006.01) |
| H04L 9/00 | (2006.01) |
| H04L 9/14 | (2006.01) |
| H04L 9/30 | (2006.01) |
| H04L 29/06 | (2006.01) |
| H04L 9/06 | (2006.01) |

(52) U.S. Cl.
CPC ............ *H04L 9/3268* (2013.01); *H04L 9/006* (2013.01); *H04L 9/14* (2013.01); *H04L 9/30* (2013.01); *H04L 9/3247* (2013.01); *H04L 63/06* (2013.01); *H04L 9/0637* (2013.01)

(58) Field of Classification Search
CPC ......... H04L 9/3268; H04L 63/06; H04L 9/14; H04L 9/30; H04L 9/0637; H04L 9/006; H04L 9/3247
See application file for complete search history.

(56) References Cited

U.S. PATENT DOCUMENTS

| | | | | |
|---|---|---|---|---|
| 6,134,551 A | * | 10/2000 | Aucsmith | ............... G06F 21/34 |
| 2002/0099822 A1 | * | 7/2002 | Rubin | ................... H04L 9/3268 |
| | | | | 709/225 |
| 2002/0138735 A1 | * | 9/2002 | Felt | .................... G06Q 20/3829 |
| | | | | 713/176 |

(Continued)

FOREIGN PATENT DOCUMENTS

WO WO-2016/204461 12/2016

OTHER PUBLICATIONS

Vida Enterprise-grade Blockchain Identity Software, https://www.vidaidentity.com, 2016. 5 pages.

*Primary Examiner* — Cheng-Feng Huang
(74) *Attorney, Agent, or Firm* — Foley & Lardner LLP

(57) ABSTRACT

A method, system, and apparatus for managing digital certificates, managing a certificate authority (CA), and cross-referencing CA hierarchies. The method includes receiving, by a processor of a CA computing system, at least one of a digital certificate generation request and a digital certificate revocation from a user via a user computing device, the digital certificate generation request including a user public key and a user identity. The method further includes generating a digital certificate for the user and signing the digital certificate with a CA private key, wherein the CA private key is associated with a known CA public key. The method further includes publishing the digital certificate signed with the CA private key to a digital certificate blockchain, determining a certificate status of the digital certificate, and publishing an update to the digital certificate blockchain to reflect the certificate status of the digital certificate.

18 Claims, 5 Drawing Sheets

(56) References Cited

U.S. PATENT DOCUMENTS

| | | | |
|---|---|---|---|
| 2004/0128504 A1* | 7/2004 | Kivinen | H04L 9/006 |
| | | | 713/158 |
| 2007/0118740 A1* | 5/2007 | Deishi | H04L 63/0823 |
| | | | 713/158 |
| 2008/0016357 A1* | 1/2008 | Suarez | H04L 63/0823 |
| | | | 713/176 |
| 2013/0031363 A1* | 1/2013 | Wnuk | H04L 9/3268 |
| | | | 713/158 |
| 2013/0212383 A1* | 8/2013 | Hallin | H04L 9/3268 |
| | | | 713/158 |
| 2015/0081566 A1* | 3/2015 | Slepinin | G06Q 20/3829 |
| | | | 705/69 |
| 2015/0206106 A1* | 7/2015 | Yago | G06Q 20/0658 |
| | | | 705/68 |
| 2016/0098730 A1* | 4/2016 | Feeney | G06Q 30/0185 |
| | | | 705/71 |
| 2016/0203496 A1 | 7/2016 | Guerrero et al. | |
| 2016/0330027 A1* | 11/2016 | Ebrahimi | H04L 9/3066 |
| 2017/0111178 A1* | 4/2017 | Winkelvos | H04W 12/04 |
| 2017/0237554 A1* | 8/2017 | Jacobs | H04L 9/0819 |
| | | | 713/171 |
| 2017/0345011 A1* | 11/2017 | Salami | G06Q 20/42 |

* cited by examiner

SYSTEMS AND METHODS FOR NOTARY AGENT FOR PUBLIC KEY INFRASTRUCTURE NAMES

TECHNICAL FIELD

Embodiments of the present disclosure relate generally to the field of digital certificates.

BACKGROUND

A blockchain is a publicly viewable, append-only, distributed ledger having wide application in the financial services industry. A blockchain includes multiple blocks, each containing data and a hash of the previous block, thereby linking the blocks in the blockchain. Blockchain entries consist of blocks of information that can include transactions, transaction record components, transaction entities, and the like.

A CA is an entity trusted by one or more other entities to create and assign digital certificates. The CA can include multiple CAs issuing certificates, including a root CA (e.g., trust anchor), at least one intermediate CA, and an issuing CA.

A digital certificate is an electronic document used to prove ownership of a public key. Digital certificates, also known as public key certificates, include the public key and the identity of an entity. Digital certificates are issued by a CA, which signs the digital certificate with the CA private key to render the digital certificate unforgeable, allowing for secure transactions between entities using the digital certificate.

A public key infrastructure (PKI) is a set of roles, policies, and procedures used to create, manage, use, store, and revoke digital certificates and manage public key encryption. A PKI facilitates secure electronic transfer of information for various electronic activities (e.g., internet banking, e-commerce, etc.). A PKI binds public keys with respective identities of entities (e.g., individuals, companies, organizations) through registration and issuance of digital certificates by a CA. A PKI creates, stores, and distributes the digital certificates, which verify that a particular public key belongs to a certain entity.

SUMMARY

A first example embodiment relates to a method of managing a digital certificate. The method includes receiving, by a processor of a CA computing system, at least one of a digital certificate generation request and a digital certificate revocation from a user via a user computing device from a user via a user computing device. The digital certificate generation request includes a user public key and a user identity. The method further includes generating a digital certificate for the user and signing the digital certificate with a CA private key. The CA private key is associated with a known CA public key. The method further includes publishing the digital certificate signed with the CA private key to a digital certificate blockchain, determining an update to the digital certificate, and publishing an update block to the digital certificate blockchain to reflect the update to the digital certificate.

Another example embodiment relates to a digital certificate management system. The system includes a network interface, a digital certificate generation circuit, and a policy information circuit. The network interface is configured to facilitate data transmission over a network. The digital certificate generation circuit is configured to receive a digital certificate request from a user and generate a digital certificate associated with the user. The digital certificate includes an identity of the user and a public key of the user. The digital certificate generation circuit digitally signs the digital certificate with a CA private key and publishes the digital certificate to a digital certificate blockchain. The policy information circuit is configured to determine an update to policy information for the digital certificate and publish the update to an update block on the digital certificate blockchain.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring generally to the figures, systems and methods for PKI management via a blockchain-based system are shown. According to various example embodiments, a PKI management system allows users and relying parties to conduct secure transactions using a blockchain, allowing for real-time updates of digital certificates, listing of revoked certificates, and other information pertinent to conducting a secure transaction.

The blockchain-based PKI management system solves technical problems associated with conventional PKI systems. Conventionally, PKI systems include important CA and digital certificate information scattered in various places (e.g., different websites, servers) and thus, it may be difficult for an entity to locate particular information about the CA or the digital certificate. CAs store digital certificate information on a local server and thus, the information is not easily accessible or ascertainable to those without access to that particular server. The tracking of CA information on the instant blockchain-based system results in transparency and increased trustworthiness of a particular CA. In current PKI systems, it can be difficult to ascertain CA policies and current statuses. Without current knowledge of a CA or digital certificate, users and relying parties can be relying on a CA or certificate that does not fit the relying parties' purposes (e.g., the relying party agreement liabilities are not desirable). Additionally, tracking revocation of certificates via the instant blockchain-based system can make transactions using digital certificates more accurate, efficient, and secure. By relying on a compromised digital certificate, the security of transactions between entities is nonexistent. The users and relying parties would no longer be relying on a revoked digital certificate because information regarding the revocation of the certificate is accessible via blockchain. According to various example embodiments, the instant blockchain-based system utilizes updates to digital certificate information to inform users and relying parties of important CA information (e.g., policies, relying party agreements, audit letters, etc.). Additionally, the instant blockchain-based system publishes information regarding revocation of certificates from a CA, allowing users and relying parties to view those revoked certificates. Further, the instant blockchain-based system preserves the history of certificate lifecycles. Unlike current systems in which certificates are simply replaced once updated, the instant blockchain-based system publishes new information (e.g., an updated certificate) in a new block without deleting other related information (e.g., a prior certificate).

Figure 1:
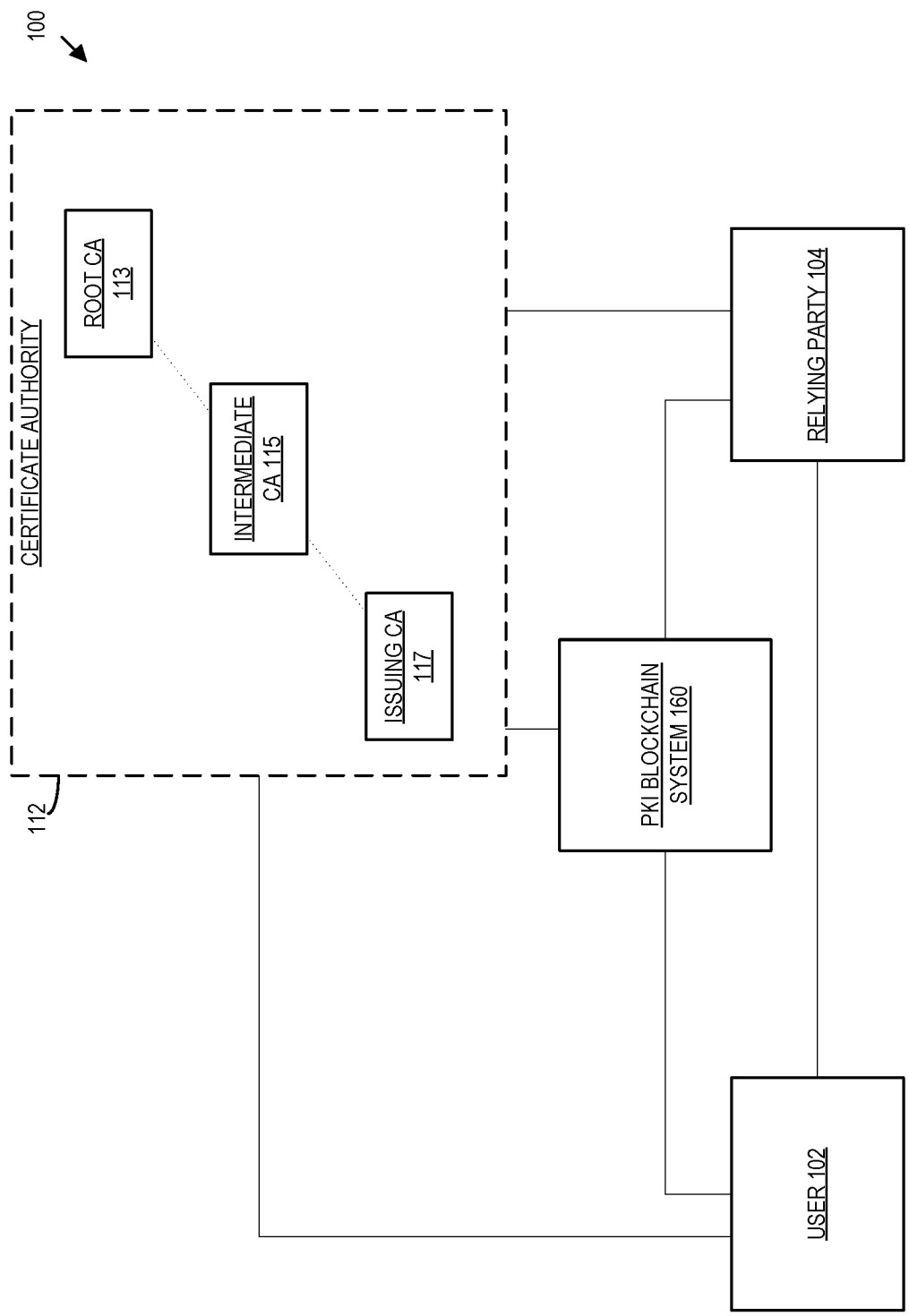
FIG. 1 is an environment view of a PKI management system, according to an example embodiment.

Referring to FIG. 1, a schematic diagram of a PKI management system 100 is shown, according to an example embodiment. As described in further detail below, the system 100 facilitates digital certificate management between various parties (e.g., user 102, relying party 104, CA 112) to a transaction using a PKI blockchain system 160.

The user 102 is an entity (e.g., individual, company, organization, etc.) desiring to securely communicate with the relying party 104. For example, the user 102 may be a party requesting and receiving a digital certificate from a CA 112 to accomplish secure communication with the relying party 104. The user 102 generates a public/private key pair and sends the public key with the digital certificate request to be validated by the CA 112. The digital certificate can be published by the CA 112 to the blockchain to be later accessed by the relying party 104 for authentication of the user 102.

The CA 112 is a trusted third party of the relationship between the user 102 and the relying party 104. The CA 112 receives the digital certificate request from the user 102, along with the public key of the user 102, and generates and signs the digital certificate with the CA private key. The CA 112 then publishes the generated and signed digital certificate to the blockchain, as described in more detail below. The CA 112 additionally updates the status of the digital certificates by adding subsequent blocks to the blockchain, as described further herein. Furthermore, the CA 112 can have a certificate practice statement, policies, relying party agreements, and so on, that the relying party 104 implicitly agrees to by accepting the digital certificate generated for the user 102. The CA 112 can publish this information on the blockchain (e.g., same or separate blockchain) to be viewable by the relying party 104.

As shown in FIG. 1, the CA 112 can include one or more CAs. A single digital certificate can be shared among multiple CAs. These CAs can include a root CA 113 (e.g., trust anchor), an intermediate CA 115, and an issuing CA 117. The root CA 113 generates a root certificate (e.g., unsigned or self-signed digital certificate). The root CA 113 can issue multiple certificates, with the root certificate as the originating certificate and the private key of which is used to sign subsequent certificates. All certificates immediately following the root certificate inherit the trustworthiness of the root certificate. Certificates further down the chain of certificates also depend on the trustworthiness of the intermediate CAs 115, also known as subordinate CAs. There can be multiple intermediate CAs 115 between the root CA 113 and the issuing CA 117. Publishing information regarding all CAs to the blockchain can be beneficial in determining where a problem with a certificate may have arisen within the chain of CAs. Additionally, different root certificates may be used to issue certificates for different business purposes and tracking the business purpose information can be helpful to linearly determine the root certificate and associated root CA 113.

The relying party 104 is an entity (e.g., individual, company, organization, etc.) receiving a request to securely communicate from the user 102. The relying party 104 views the digital certificate of the user 102 that has been published to the blockchain to verify the identity of the user 102 prior to authorizing a secure communication. The relying party 104 relies on the CA 112 as a trusted third party and uses the CA public key to determine that the user 102 has a verified identity. As noted above, the relying party 104 implicitly agrees to the terms of the digital certificate issuing from the CA 112. Thus, it is beneficial to the relying party 104 to view the certificate practice statement, policies, relying party agreements, and the like, via the blockchain.

The following is an example interaction between the user 102, relying party 104, and the CA 112. The system 100 allows the user 102 to submit a digital certificate request to the CA 112 (received and processed by the CA computing system 116). The user computing system 106 generates a public/private key pair to send to the CA 112. The CA 112 verifies the identity of the user 102, generates a digital certificate including the identity and the public key of the user 102, and signs the digital certificate with the CA private key. The CA 112 publishes the digital certificate of the user 102 with the identity and public key of the user 102 and the public key of the CA 112 to the digital certificate blockchain 121, described further herein. To participate in a secured communication with the relying party 104, the user 102 sends a message request (e.g., secure network request, communication request, transaction request, etc.) to the relying party 104 (received and processed by the relying party computing system 108). For example, the message request is for secured communication via a website. In this example, the user 102 submits the message request to the relying party 104. Using the PKI blockchain system 160, the relying party 104 can access the signed digital certificate of the user 102 on the digital certificate blockchain 121, described further herein. In one embodiment, the digital certificate information may be included with the message request from the user 102. In another embodiment, the creation and publication of digital certificates as well as access to the published certificates occurs exclusively within the PKI blockchain system 160. The relying party 104 can additionally access current policy information and relying party agreements within the PKI blockchain system 160 via the digital certificate blockchain 121, as well as check whether the digital certificate has been revoked. The relying party 104 verifies the identity of the user 102 using the CA public key. The relying party 104 then establishes the secure connection, thereby allowing the user 102 to communicate with the relying party through the secured connection.

Management of the PKI blockchain system 160 occurs throughout the interaction between the user 102, relying party 104, and CA 112. The CA 112 (or other entities, such as an auditor, registration authority, and so on) can update the digital certificate policy information and agreements within the blockchain system 160, as described further herein. Additionally, any revoked certificates can be published to the blockchain system 160 and can be made publicly available such that a relying party 104 and user 102 can view such information.

Figure 2:
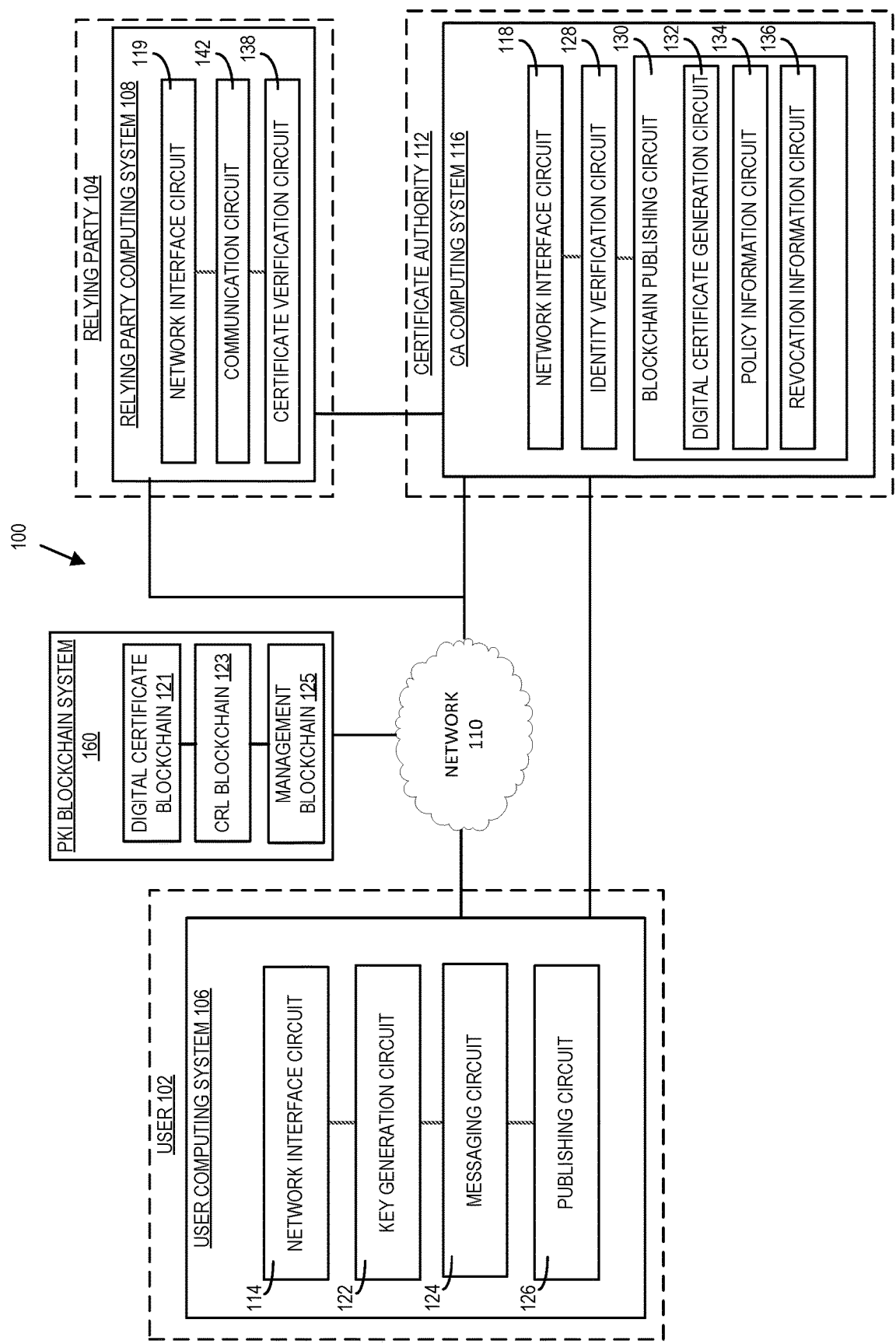
FIG. 2 is a detailed schematic diagram of the PKI management system of FIG. 1, according to an example embodiment.

Referring to FIG. 2, a schematic diagram of a PKI management system 100 is shown, according to an example embodiment. As described in further detail below, the system 100 facilitates digital certificate issuance by a CA 112. Additionally, the system 100 facilitates maintenance of digital certificates by various parties (e.g., user 102, relying party 104, CA 112, etc.) to a communication using a PKI blockchain system 160. As shown, the system 100 includes a user computing system 106 communicably and operatively coupled to each of a relying party computing system 108 associated with a relying party 104, a PKI blockchain system 160, and a CA computing system 116 associated with a CA 112, over a network 110. The network 110 provides communicable and operative coupling between the CA computing system 116, user computing system 106, relying party computing system 108, the PKI blockchain system 160, and the other components disclosed and described herein to provide and facilitate the exchange of communications (e.g., data, instructions, values, commands, etc.). Accordingly, the network 110 may include, for example, the Internet, cellular networks, proprietary cloud networks, and the like.

The PKI management system 100 allows management of publicly viewable blockchain entries pertaining to issuance and management of digital certificates. The PKI blockchain system 160, described further herein, includes a distributed permission-based blockchain system, where members are authorized to participate. Other embodiments include a permissionless blockchain system in addition to, or instead of, the permission-based blockchain system. For example, for a permissionless blockchain system, an entity does not have to be recognized as having a previous relationship with the system (e.g., public blockchain systems, Bitcoin, etc.), whereas for a permission-based blockchain system, the entity must be recognized as having a previous relationship with the system (e.g., private blockchain systems, private FI systems). For example, in a permission-based blockchain system, an entity desiring to utilize the system 100 must first be recognized and authorized to partake in the system.

The PKI blockchain system 160 may include digital certificates of the user 102 signed by the CA 112 and information relating to the digital certificates, such as audit letters, policy and practice statements, relying party agreements, and so on. In some embodiments, uniform resource identifiers (URIs) are stored on the PKI blockchain system 160. The URIs, for example, may point to a location from which the underlying information may be retrieved. For example, in some embodiments, URIs include uniform resource locators (URLs) of webpages from which the underlying data may be retrieved. In some embodiments, a combination of underlying data (e.g., digital certificates) and URIs (e.g., URLs pointing to audit letters and relying party agreements) are stored on the PKI blockchain system 160. In some embodiments, the size of the PKI blockchain system 160 is prevented from getting excessively large by storing URIs on the PKI blockchain system 160 rather than the underlying data.

The PKI blockchain system 160 is communicably and operatively coupled to both the CA computing system 116 and the relying party computing system 108 such that access to the system 160 is available to both the CA 112 and the relying party 104. In some arrangements, the PKI blockchain system 160 may additionally be accessible to the user 102 to add any subsequent information regarding a certificate in a subsequent block on the blockchain. As noted above, the PKI blockchain system 160 may comprise a distributed permission-based blockchain system, where members are authorized to participate. Other embodiments include a permissionless blockchain system in addition to, or instead of, the permission-based blockchain system. In some embodiments, the PKI blockchain system 160 facilitates cross-referencing of two or more blockchains existing within the blockchain system 160. Multiple blockchains (e.g., digital certificate blockchains, revocation blockchains, management blockchains) can be cross-referenced based on user 102 or common name, which identifies the host name associated with the issued certificate. For example, if a first certificate is issued from a first CA and a second certificate is issued from a second CA under the same common name, the first and second certificates can be linked to each other regardless of whether both certificates have the same public key. In this way, information regarding related certificates that may have been issued from different CAs is easily found without having to identify and sift through multiple blockchains.

The PKI blockchain system 160 includes a digital certificate blockchain 121, a certificate revocation list (CRL) blockchain 123, and a management blockchain 125. In some embodiments, the CRL blockchain 123 can be part of the digital certificate blockchain 121, such that the information pertaining to a CRL is stored on the digital certificate blockchain 121. In some embodiments, the management blockchain 125 can also be part of the digital certificate blockchain 121, such that information pertaining to policies, agreements, and audit letters is stored on the digital certification blockchain 121. The PKI blockchain system 160 is structured to store a plurality of digital certificates, policies, relying party agreements, revoked certificates, business purposes, etc., on the digital certificate, CRL blockchain, and management blockchains 121, 123, 125. In particular, the digital certificate blockchain 121 includes a listing of digital certificates of various users 102 issued by the CA 112. Some embodiments include multiple digital certificate blockchains 121. For example, in some embodiments, a separate (e.g., parallel, shadow, etc.) digital certificate blockchain 121 is created for digital certificates relating to particular business purposes. In some embodiments, a separate digital certificate blockchain 121 is created for digital certificates containing certain types of relyi19ng party agreements (e.g., with varying levels of liability). In some arrangements, the digital certificate blockchain 121 includes individual regionalized blockchains such that a separate blockchain for each geographic region is created for digital certificates in that particular region. For example, a separate digital certificate blockchain 121 may exist for certificates issued to a user 102 in the United States such that certificates in other regions are not viewable within that blockchain.

The CRL blockchain 123 includes a listing of revoked certificates and related CAs. The CRL blockchain 123 can include both non-restricted and restricted revocation information. For example, some entities may be able to access and publish on the CRL blockchain 123 and other entities may not have access to publish on the blockchain 123 based on an entity-type. For example, an individual may not have access to publish a revoked certificate on the blockchain, but a CA may have access to do so. Some embodiments include multiple CRL blockchains 123. For example, in some embodiments, a separate CRL blockchain 123 is created for CRLs having particular selective encryption. A separate CRL blockchain 123 may be created for lists in which selective encryption is managed by the CA, an auditor, or other third party.

The management blockchain 125 includes a listing of policies, relying party agreements, audit letters, and information regarding mergers and acquisitions of CAs. Updates to the policies, relying party agreements, audit letter, and information regarding mergers and acquisitions of CAs are stored on the management blockchain 125 to be separately accessible. The management blockchain 125 is maintained separately from the digital certificate blockchain 121 and the CRL blockchain 123 such that a user 102 or permissioned third party may review audit letters, agreements, and policies without sifting through the digital certificate or CRL blockchains 121, 123.

The user computing system 106 is associated with or operated by the user 102 (e.g., individual, company, organization, etc.). The user computing system 106 may include any type of computing system including, but not limited to, a phone (e.g., smartphone, etc.) and a computing device (e.g., tablet computer, laptop computer, desktop computer, personal digital assistant, etc.). The user computing system 106 is communicably and operatively coupled to the relying party computing system 108 and the CA computing system 116 to facilitate interaction between the user 102, relying party 104, and CA 112. Additionally, in some embodiments, the user computing system 106 is communicably and operatively coupled to the PKI blockchain system 160 to facilitate management of digital certificates on the blockchain. The user computing system 106 includes a network interface circuit 114, a key generation circuit 122, and a messaging circuit 124. In some embodiments, the user computing system 106 further includes a publishing circuit 126.

The network interface circuit 114 is structured to facilitate operative communication between the user computing system 106 and other systems and devices over the network 110. The user computing system 106 may, for example, include one or more servers each with one or more processors configured to execute instructions stored in a memory, send and receive data stored in the memory, and perform other operations to implement the digital certificate services described herein associated with the processing modules, databases and processes shown.

The key generation circuit 122 is structured to generate a public/private key pair associated with the user 102 for the digital signature of the message sent by the user 102, described below in the messaging circuit 124. The public/private key pair is associated with a digital certificate in a PKI, for example, the X.509 certificate. A key pair is generated (the private/public key pair must be generated together as they are mathematically related), the private key signs the public key, and the pair is submitted to the CA 112. In some embodiments, the key pair can be sent to a front end registration authority (RA), which will verify the identity of the user 102. The CA 112 will receive the verification and generate the digital certificate for the user 102. Alternatively, the private/public key pair could be issued with a commercial CA, for example, one associated with a financial institution. In some arrangements, the user computing system 106 retrieves a public key certificate from the commercial CA and uses the certificate to ascertain the public/private key pair. In other embodiments, the key generation circuit 122 generates an ephemeral public/private key pair not associated with a digital certificate in a PKI. In these embodiments, the public key can be included in the attributes of the message sent by the user to the relying party, allowing a digital signature verifier to use the included public key component to verify message integrity. In these arrangements, the verifier will be able to verify message integrity (e.g., that it has not been modified), but will not gain origin authenticity assurance (e.g., know who signed the message and who possessed the private key component of the key pair).

The messaging circuit 124 is structured to send a communication request to the relying party computing system 108 via the network 110. The messaging circuit 124 sends a message request to the relying party computing system 108 to establish communication between the user 102 and the relying party 104. The message can include a transaction request including, but not limited to, a request to conduct a financial transaction, a request to communicate via a secured network, and so on. The message includes the generated digital certificate of the user 102 to be used by the relying party 104 to verify the identity of the user 102. In other embodiments, the messaging circuit 124 does not include the digital certificate of the user 102 as it may be published to the blockchain via the PKI blockchain management system 160 (e.g., by the CA computing system 116), and is viewable by the relying party 104 on the digital certificate blockchain 121, as described further herein.

In some embodiments, the user computing system 106 includes a publishing circuit 126. The publishing circuit 126 is structured to receive digital certificate-related information (e.g., policies, relying party agreements, revocation of certificates, etc.); determine whether the information should be published to the digital certificate, CRL, or management blockchains 121, 123, 125; determine what, if any, encryption should be used to process and protect the data; and ultimately publish the data to the correct blockchain in the correct format on the PKI blockchain system 160. The publishing circuit 126 receives information from the CA 112 (or another trusted third party) as revocations occur or as practices and agreements change. In other embodiments, the CA computing system 116 additionally, or alternatively, publishes this information to the blockchain system 160.

The relying party computing system 108 may be associated with or operated by the relying party 104 (e.g., an individual, company, organization, etc.). The relying party computing system 108 may be communicably and operatively coupled to the PKI blockchain system 160 to facilitate authentication of a user 102 using a digital certificate published to the digital certificate blockchain 121 of the PKI blockchain system 160. The relying party computing system 108 includes a network interface 119, a communication circuit 142, and a certificate verification circuit 138.

The network interface 119 is structured to facilitate operative communication between the relying party computing system 108 and other systems and devices over the network 110. The relying party computing system 108 may, for example, include one or more servers each with one or more processors configured to execute instructions stored in a memory, send and receive data stored in the memory, and perform other operations to implement the digital certificate services described herein associated with the processing modules, databases and processes shown.

The communication circuit 142 is structured to receive a communication request from the user 102 via the network 110. In some embodiments, the communication circuit 142 receives the signed digital certificate from the user 102 along with the communication request. The communication circuit 142 communicates the request to the certificate verification circuit 138. The communication circuit 142 is further structured to complete a secured communication (e.g., transaction) between the user computing system 106 and the relying party computing system 108 once the certificate verification circuit 138 has verified the identity of the user 102, as described below. The secured communication can include completing a financial transaction, securing confidential email, etc. The communication circuit 142 is thus communicably and operatively coupled to the messaging circuit 124 of the user computing system 106 to receive a communication request from the user 102. The communication circuit 142 is additionally communicably and operatively coupled to the certificate verification circuit 138 of the relying party computing system 108 to communicate the communication request to the certificate verification circuit 138.

The certificate verification circuit 138 is structured to verify the identity of a requesting user 102 using the signed digital certificate of the user 102. In one embodiment, the certificate verification circuit 138 accesses the digital certificate blockchain 121 to view the signed digital certificate of the user 102. The digital certificate is published to the blockchain 121 by the CA computing system 116 and is viewable by the relying party computing system 108. In another embodiment, the certificate verification circuit 138 receives a digital certificate from the user 102 via the messaging circuit 124 of the user computing system 106. The certificate verification circuit 138 verifies the digital signature of the user 102 using the CA public key, which is known to the relying party 104. In some embodiments, the certificate verification circuit 138 additionally checks the CRL blockchain 123 to determine whether the digital certificate has been revoked. In further embodiments, the certificate verification circuit 138 can check the digital certificate blockchain 121 to determine whether there have been updates to the policies, agreements, or practice statements relating to the digital certificate. If the digital certificate has been revoked or a policy has been changed to an undesirable policy for the relying party 104, the certificate verification circuit 138 may deny the communication request from the user 102 and no secure connection will be established.

In some embodiments, the relying party computing system 108 includes a publishing circuit 146. The publishing circuit 146 is structured to receive digital certificate related information (e.g., policies, relying party agreements, revocation of certificates, etc.), determine whether the information should be published to the digital certificate or CRL blockchains 121, 123, determine what, if any, encryption should be used to process and protect the data, and ultimately publish the data to the correct blockchain in the correct format on the PKI blockchain system 160. The publishing circuit 146 receives information from the CA 112 (or another trusted third party) as revocations occur or as practices and agreements change. In other embodiments, the CA computing system 116 additionally, or alternatively, publishes this information to the blockchain system 160.

The CA computing system 116 is associated with or operated by the CA 112. The CA computing system 116 includes a network interface 118, an identity verification circuit 128 and a blockchain publishing circuit 130. The network interface 118 is structured to facilitate operative communication between the CA computing system 116 and other systems and devices over the network 110. The CA computing system 116 may, for example, include one or more servers each with one or more processors configured to execute instructions stored in a memory, send and receive data stored in the memory, and perform other operations to implement the compliance services described herein associated with the processing modules, databases and processes shown.

The identity verification circuit 128 is structured to verify the identity of a user 102 requesting a digital certificate. To generate a digital certificate, the CA computing system 116 must first verify the identity of the user 102 that is to be associated with the public key of the user 102 on the digital certificate. To verify the identity of a user 102, the identity verification circuit 128 receives information from the user computing system 106 regarding the identity of the user 102.

The identity verification circuit 128 checks that the request for a digital certificate is in compliance with certificate practice statements and policies. Then, the identity verification circuit 128 authenticates the identity of the user 102 in according with those statements and policies. In some embodiments, the identity verification is completed by a front end RA, as noted above. In this embodiment, the RA checks that requests are valid and authenticates the identity of the user 102 in accordance with requirements in the practice statements and policies. Once satisfied, the RA forwards the request to the CA 112 to sign and issue a digital certificate to the intended user 102.

The blockchain publishing circuit 130 is structured to receive digital certificate update information (e.g., policies, practices, revocations, relying party agreements, etc.), determine whether the information should be published to the digital certificate, CRL blockchain, or management blockchains 121, 123, 125, determine what, if any, encryption should be used to process and protect the data, and ultimately publish the data to the correct blockchain in the correct format on the PKI blockchain system 160. The blockchain publishing circuit 130 receives information from the CA computing system 116 as revocations occur or as practices and agreements change. The blockchain publishing circuit 130 includes a digital certificate generation circuit 132, a policy information circuit 134, and a revocation information circuit 136.

In some arrangements, the blockchain publishing circuit 130 utilizes a digital signature schema to provide authentication, integrity, and non-repudiation to a future verifier. The digital signature schema could be used by one or more of the circuits that are included on the blockchain publishing circuit 130, for example the digital certificate generation circuit 132, the policy information circuit 134, or the revocation information circuit 136. In those arrangements, the circuits within the blockchain publishing circuit 130 generate a messaging authentication code (MAC) using a specific symmetric cipher mode of operation called cipher block chaining. Alternatively, the circuits within the blockchain publishing circuit 130 could generate a keyed hash message authentication code ("HMAC") that uses a hash algorithm instead of the symmetric cipher. In some arrangements, the blockchain publishing circuit 130 is structured to publish a cross-reference between multiple CAs such that certificates with the same common name are linked to each other. In addition, the blockchain publishing circuit 130 can link multiple certificates from the same issuing CA and user with differing public keys.

The digital certificate generation circuit 132 is structured to receive a request for a digital certificate from a user computing system 106. The digital certificate generation circuit 132 is additionally structured to generate a digital certificate for a user 102 based on the request and publish the digital certificate to the digital certificate blockchain 121 on the PKI blockchain system 160. The digital certificate includes the identity and public key of the user 102 received from the key generation circuit 122 of the user computing system 106 signed with the public key of the CA 112. The digital certificate is published to the digital certificate blockchain 121 for access by the relying party computing system 108. In some arrangements, the digital certificate generation circuit 132 is structured to generate a cross-reference link between an existing digital certificate chain that a digital certificate is being published to and a different certificate chain generated for a different CA that may be related to the digital certificate either by user or common name, as described above.

The policy information circuit 134 is structured to receive, organize, and publish information related to the policies and practices of the CA 112 and other entities (e.g., auditors, registration authorities) to the management blockchain 125. The policy information circuit 134 is structured to also publish to the management blockchain 125 information related to the merger or acquisition of CAs. For example, policies and practices published to the management blockchain 125 may include relying party agreements, audit letters, CA policies, business purposes, merger and acquisition data, etc. In some embodiments, the policy information circuit 134 publishes information related to the policies and practices of the CA 112, as well as information related to merger or acquisition of CAs, to the digital certificate blockchain 121. The policy information circuit 134 also organizes the information into restricted and non-restricted information. The restricted information is encrypted by a content encryption key via a corresponding encryption algorithm, whereas the non-restricted information is unencrypted and can be viewed by any entity that accesses the digital certificate blockchain 121 and the management blockchain 125 in the PKI blockchain system 160. For example, the CA policies and practices may include non-restricted information, viewable by subscribers, auditors, regulators, potential new subscribers, and the like, without requiring a content encryption key.

The policy and practice information can contain general information related to the obligations and actions the CA 112 would be required to perform throughout the active life of a digital certificate. The policies and practices information can be selectively encrypted and may outline the specific information related to the actions the CA 112 has agreed to take in regards to the CA's policies for one or more digital certificates. The policy and practice information may be specific to a single digital certificate. For example, the management blockchain 125 may contain non-restricted policy information of the CA that the CA will inform all users 102 and relying parties 104 of all revoked certificates in a timely manner, whereas the restricted practice information on the management blockchain 125 may be that the CA 112 will notify a specific user 102 and relying party 104 within 24 hours that a certificate has been revoked. The practice data needs to be restricted for security purposes: third party entities (and potential security attackers) should not know the exact time it will take the CA 112 to notify of certificate revocations, and the other users do not need to know of the specific negotiated terms of users on the system, for confidentiality purposes.

In some embodiments, the management blockchain 125 includes multiple different service policies and practices (e.g., corresponding to different products, different business purposes, etc.). In some embodiments, the different service policies and practices are stored in individual management blockchains 125. However, in other embodiments, the different services policies and practices are stored in a single management blockchain 125. As described above, in some embodiments, the service policies and practices are stored on the digital certificate blockchain 121 and can be stored in individual digital certificate blockchains 121 in a similar manner.

In some embodiments, business purposes published by the policy information circuit 134 identify certain business applications for which use of a particular certificate is authorized. For example, the policy information circuit 134 may specify that a first certificate is to be used only to sign mortgages, while a second certificate is to be used only to sign legal documents. This additional information published by the policy information circuit 134 overcomes technical problems associated with current systems. For example, current systems include a key usage field that specifies certain cryptography details regarding a certificate. For example, a key usage field may specify that a key is to be used for digital signatures or for key management. However, the key usage field is not used to specify particular business applications for which the key is to be used. Accordingly, the policy information circuit 134 provides an additional level of granularity by which further information on key usage may be specified.

The revocation information circuit 136 is structured to organize and publish the information related to the revocations of digital certificates to the CRL blockchain 123 of the PKI blockchain system 160. For example, revocation information may indicate that a digital certificate for a CA has been revoked. The revocation information circuit 136 publishes a block to the CRL blockchain 123 indicating the certificate that has been revoked. In some arrangements, when publishing the revocation information, the revocation information circuit 136 can confirm that a corresponding private key has been destroyed.

The revocation information circuit 136 may implement a variety of publishing mechanisms depending on the desired schema of the PKI system. In some arrangements, the revocation information circuit 136 can catalog revocations as they occur and then encrypt and publish the revocations to the CRL blockchain 123 after a period of time (e.g., every hour, every day, etc.). In other arrangements, the revocation information circuit 136 can publish revocations to the CRL blockchain 123 in real-time as they occur. In some embodiments, the revocation information circuit 136 can publish revocations directly to the digital certificate blockchain 121, or on a parallel or shadow blockchain to the digital certificate blockchain 121 linking the revocation information with the policy information of each digital certificate. In some embodiments, the revocation information circuit 136 is structured to create an associated CRL blockchain 123 for each digital certificate practices and policies in the digital certificate blockchain 121.

By publishing revocation information to the centralized, publically-available CRL blockchain 123, the revocation information circuit 136 enables users to manage revocations much more efficiently than current systems. For example, in current systems, system administrators must manually update certificate chains once CRLs are updated. In contrast, by publishing CRLs to the CRL blockchain 123, various embodiments automatically update certificate chains once a CRL is posted.

Figure 3:
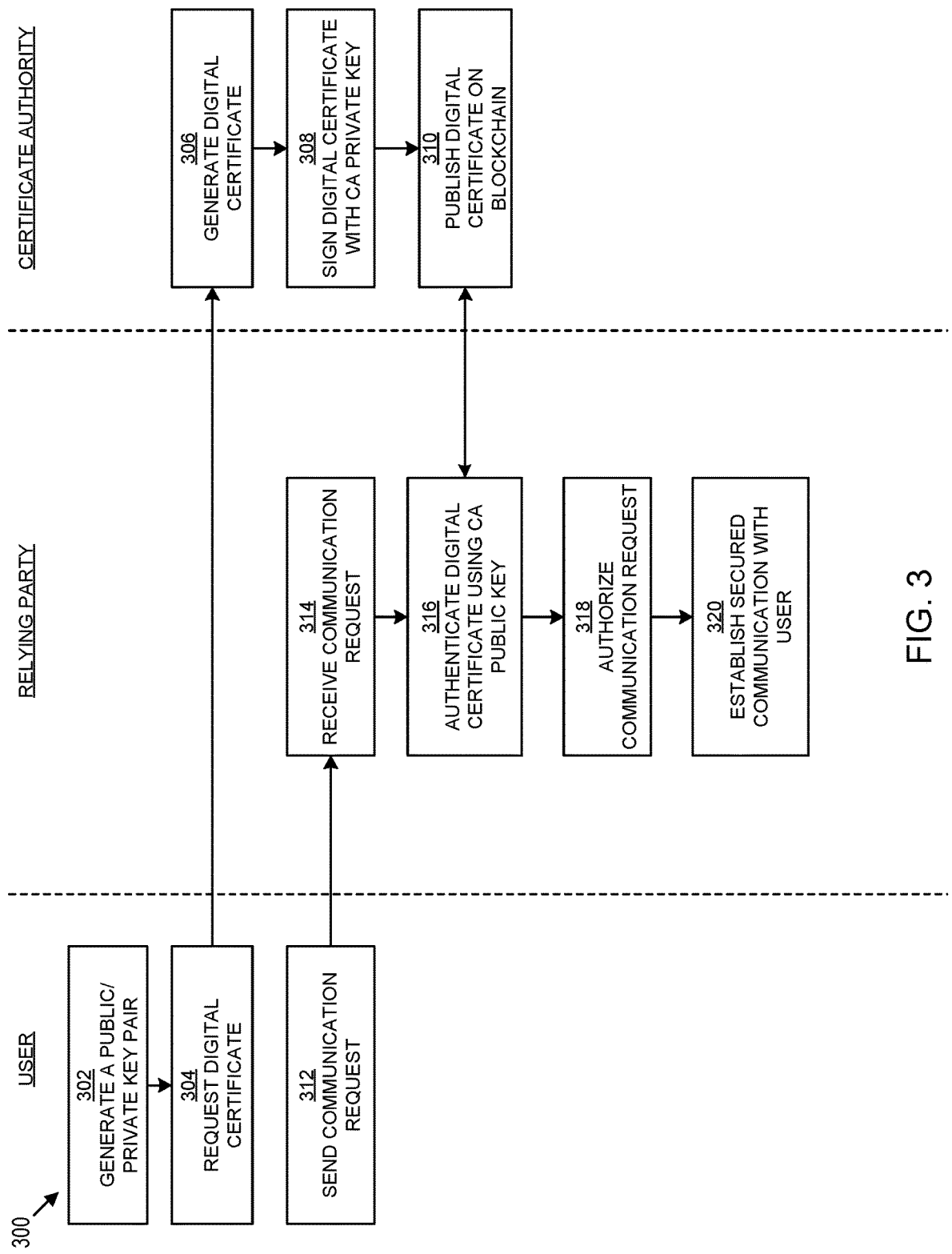
FIG. 3 is a flow diagram of interactions between a user, a CA, and a relying party in relation to the PKI management system of FIG. 1, according to an example embodiment.

Referring now to FIG. 3, a flow diagram of interactions between a user 102, a relying party 104, and a CA 112, including use of the PKI blockchain system 160 is shown, according to an example embodiment. First, at 302, a user 102 generates a public/private key pair using the key generation circuit 122 and at 304, sends a request for a digital certificate to the CA 112 (received and processed by the CA computing system 116). The user 102 sends the public key along with the digital certificate request to the CA 112. At 306, the CA computing system 116 verifies the identity of the user 102 using the identity verification circuit 128 and generates a digital certificate for the user 102 using the digital certificate generation circuit 132. At 308, the identity verification circuit 128 signs the digital certificate using the digital certificate generation circuit 132. At 310, the CA 112 publishes the digital certificate to the digital certificate blockchain 121 within the PKI blockchain system 160.

At 312, the user 102 sends a communication request to the relying party 104. As shown at 314, all user requests (e.g., the communication request 206 sent at 312) are received at a communication circuit 142 of the relying party computing system 108. The communication circuit 142 may communicate directly with user devices (e.g., user computing systems 106) via a network (e.g., network 110). The communication circuit 142 communicates the request to the certificate verification circuit 138.

The certificate verification circuit 138 accesses the digital certificate blockchain 121 to view the digital certificate of the user 102. At 316, the certificate verification circuit 138 authenticates the digital certificate using the CA public key. At 318, the communication with the user 102 is then authorized via the digital certificate and at 320, the communication circuit 142 completes a secured communication with the user 102.

Figure 4:
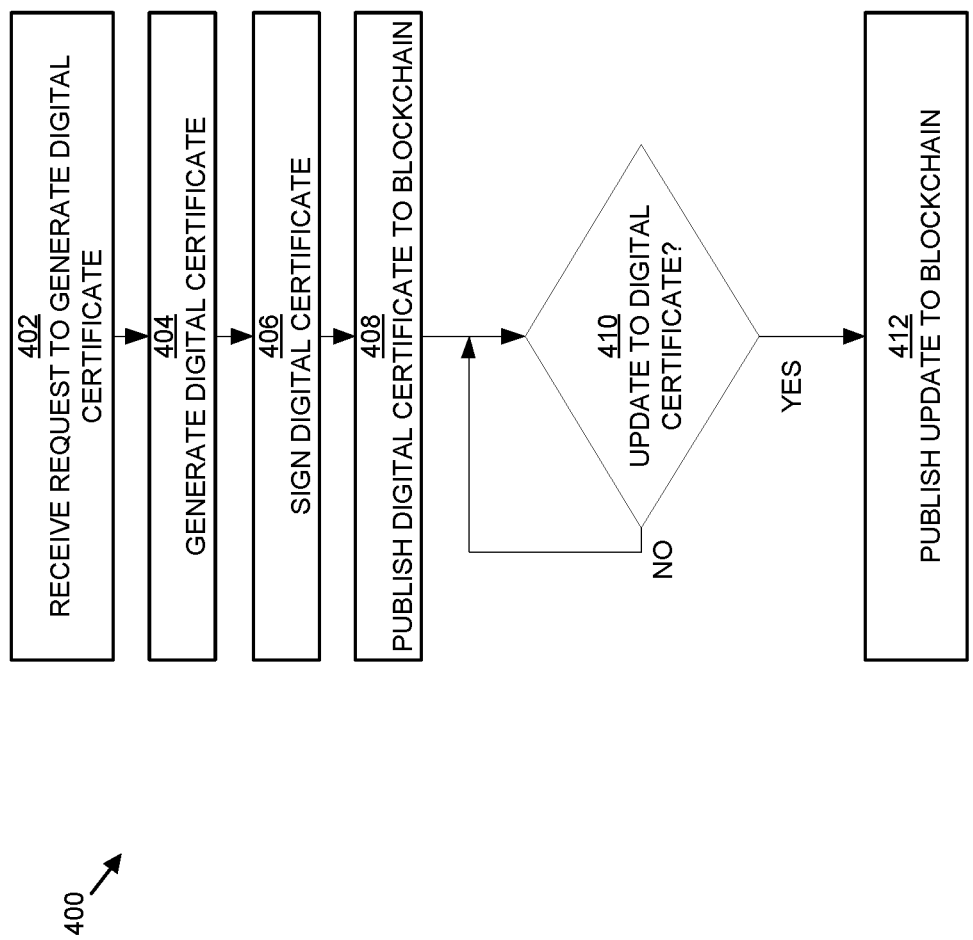
FIG. 4 is a flow diagram of digital certificate creation and maintenance via blockchain, according to an example embodiment.

Referring now to FIG. 4, a method 400 of generating a digital certificate and updating the certificate via the PKI management system 100 is shown, according to an example embodiment. In describing method 400, references may be made to FIGS. 1-3.

At 402, a request to generate a digital certificate is received. The digital certificate request may include information relating to an identity of a user and the public key of the user. The public key of the user is generated by the user computing device 106 in combination with a private key. In some arrangements, the request is transmitted from a user device (e.g., a personal computer, a smartphone, user computing system 106, etc.) and received by the digital certificate generation circuit 132 of the CA computing system 116.

At 404, upon receiving the request, the digital certificate is generated. The digital certificate includes the identity and public key of the user. The digital certificate can include other information, such as the identity of the CA 112, the lifetime of the certificate, and other user information.

At 406, the digital certificate is signed by the CA. The CA 112 signs the digital certificate using the CA private key. The digital signature serves as a certification from the CA 112 that information provided in the certificate can be trusted.

At 408, the digital certificate is published to the blockchain. More specifically, the signed digital certificate is published to the digital certificate blockchain 121 of the PKI blockchain system 160. The digital certificate is accessible by relying parties to verify the user 102 and authorize a communication request from the user 102.

At 410, updates to the digital certificate are determined. Any updates to the digital certificate and/or CA 112 are ascertained by the policy information circuit 134. The policy information circuit 134 can determine any changes or updates to any relying party agreements, audit letters, CA policies, business purposes, merger and acquisition data, etc. The policy information circuit 134 can also organize the information into restricted and non-restricted information.

At 412, updates to the digital certificate are found at 412 are published to the blockchain. The policy information circuit 134 can publish any relying party agreements, audit letters, CA policies, business purposes, merger and acquisition data, etc. The policy information can be published on a separate second blockchain parallel to and associated with the digital certificate blockchain 121 (e.g., a parallel or shadow blockchain), or can be published on the digital certificate blockchain 121 in a subsequent block on the blockchain 121.

Figure 5:
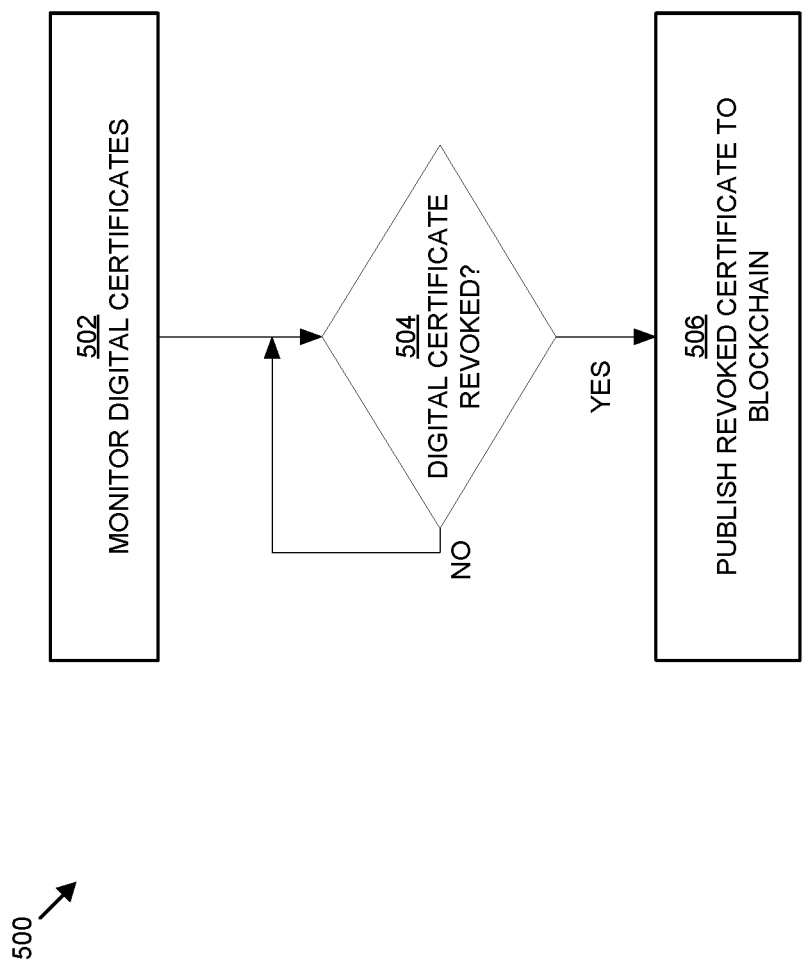
FIG. 5 is a flow diagram of certificate revocation list maintenance via blockchain, according to an example embodiment.

Referring now to FIG. 5, a method 500 of monitoring and updating digital certificate status via the PKI management system 100 is shown, according to an example embodiment. In describing method 500, references may be made to FIGS. 1-3.

At 502, the digital certificates are monitored. The published digital certificates can be monitored in real-time by the CA computing system 116. The published digital certificates can additionally be monitored by any other entity via the blockchain. Varying levels of access can be afforded to different parties based on the status of the entity (e.g., an individual may have a lower level of access than a financial institution, etc.). Some entities may not be able to access the blockchain to view this information.

At 504, a certificate is found to be revoked. The revocation information circuit 136 of the CA computing system 116 can determine that a digital certificate has been revoked and can determine the CA associated with the revoked certificate. Alternatively, the user 102 or relying party 104 can determine that a certificate has been revoked and can communicate the revocation to the CA computing system 116 or can directly update the blockchain if update access is granted.

At 506, the revoked certificate is published to the blockchain. Upon finding a certificate has been revoked, the revoked certificate is published to the CRL blockchain 123 by the revocation information circuit 136. In some arrangements, the revocation information circuit 136 can publish revoked certificates periodically (e.g., every hour, every day, etc.). In other arrangements, the revocation information circuit 136 can publish revocations to the CRL blockchain 123 in real-time as they occur. In other embodiments, the revocation information circuit 136 can publish revocations directly to the digital certificate blockchain 121, or as a parallel or shadow blockchain to the digital certificate blockchain 121 linking the revocation information with the policy information of each digital certificate. In some embodiments, the revocation information circuit 136 is structured to create an associated CRL blockchain 123 for each digital certificate in the digital certificate blockchain 121.

The blockchain-based PKI management system solves technical problems associated with conventional PKI systems. Specifically, in current systems in instances where a digital certificate has been compromised, users and third parties may unknowingly rely on a revoked certificate and may compromise important security information by relying on those certificates. In conventional systems it is not easily ascertainable when and where the compromise may have taken place. In the instant system, users and relying parties would no longer be relying on a revoked digital certificate because information regarding the revocation of the certificate is readily accessible via blockchain. The instant blockchain-based system utilizes updates to digital certificate information to inform users and relying parties of updates to important CA information. In this way, the instant blockchain-based system preserves the history of certificate lifecycles. Unlike current systems in which certificates are simply replaced once updated, the instant blockchain-based system publishes updated certificates in a new block without deleting information related to any prior certificates. Thus, tracking revocation of certificates via the instant blockchain-based system can make transactions using digital certificates more accurate, efficient, and secure.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of managing digital certificates, the method comprising:
    receiving, by a processor of a certificate authority (CA) computing system, a communication request comprising at least one of a digital certificate generation request and a digital certificate revocation from a user via a user computing device, the digital certificate generation request including a user public key and a user identity;
    generating, by the processor, a digital certificate for the user;
    signing, by the processor, the digital certificate with a CA private key, wherein the CA private key is associated with a known CA public key;
    publishing, by the processor, the digital certificate signed with the CA private key to a digital certificate blockchain;
    monitoring, by the processor, a certificate status of the published digital certificate in real-time, wherein monitoring the certificate status comprises monitoring a revocation of the published digital certificate in real-time;
    publishing, by the processor, an update to the digital certificate blockchain to reflect a change in the certificate status of the digital certificate according to the monitored certificate status in real-time;
    allowing, by the processor, the communication request in response to determining that the digital certificate is not revoked according to the published update of the certificate status;
    denying, by the processor, the communication request from the user in response to determining that the digital certificate is revoked according to the published update of the certificate status; and
    publishing, by the processor, a revocation block to a certificate revocation list (CRL) blockchain to reflect the revocation of the digital certificate;
    wherein the digital certificate revocation is managed via the CRL blockchain;
    wherein at least one of an updated policy, an updated relying party agreement, and an updated audit letter are managed via a management blockchain.

2. The method of claim 1, further comprising:
    publishing, by the processor, a revocation block to the digital certificate blockchain to reflect the revocation of the digital certificate.

3. The method of claim 1, wherein the CA computing system is managed by a CA group;
    wherein the CA group includes a plurality of CAs comprising:
        one or more root CAs, wherein the one or more root CAs are trust anchors;
        one or more intermediate CAs; and
        one or more issuing CAs, wherein the one or more issuing CAs issue the digital certificate to the user.

4. The method of claim 1, wherein the update is subsequent to a block containing the digital certificate.

5. The method of claim 1, wherein the digital certificate is managed via the digital certificate blockchain, wherein the digital certificate blockchain is accessible to each of a relying party and the user.

6. The method of claim 1, further comprising:
    storing, by the processor, a uniform resource identifier (URI) comprising a uniform resource locator (URL) from which underlying data is retrieved.

7. A digital certificate management system comprising:
    a network interface configured to facilitate data transmission over a network;
    a request circuit configured to:
        receive a communication request comprising a digital certificate request from a user;
        generate a digital certificate associated with the user, wherein the digital certificate comprises:
            an identity of the user; and
            a public key of the user;
        digitally sign the digital certificate with a certificate authority (CA) private key; and
        publish the digital certificate to a digital certificate blockchain;
    a policy information circuit configured to:
        monitor an update to policy information for the digital certificate in real-time, the update information comprising revocation information of the digital certificate; and
        publish the update to an update block on the digital certificate blockchain in real-time; and
    a revocation information circuit configured to:
        determine whether the digital certificate has been revoked based on the published update;
        allow the communication request in response to determining that the digital certificate is not revoked according to the published update;
        deny the communication request from the user in response to determining that the digital certificate is revoked according to the published update; and
        publish revocation information to a revocation block on a certificate revocation list (CRL) blockchain;
    wherein the digital certificate revocation is managed via the CRL blockchain;
    wherein at least one of an updated policy, an updated relying party agreement, and an updated audit letter are managed via a management blockchain.

8. The system of claim 7, wherein the update block is subsequent to a block containing the digital certificate.

9. The system of claim 7, wherein the revocation information circuit is further configured publish revocation information to a revocation block on the digital certificate blockchain.

10. The system of claim 7, wherein the revocation information circuit is further configured to confirm destruction of the CA private key upon determining that the digital certificate has been revoked.

11. The system of claim 7, wherein the digital certificate management system is managed by a CA group;
    wherein the CA group includes a plurality of CAs comprising:
        one or more root CAs, wherein the one or more root CAs are trust anchors;
        one or more intermediate CAs; and
        one or more issuing CAs, wherein the issuing CA issues the digital certificate to the user.

12. The system of claim 7, wherein the digital certificate management system is managed via the digital certificate blockchain, wherein the digital certificate blockchain is accessible to each of a relying party and the user.

13. The system of claim 7, wherein underlying data is stored and accessible at a URL included in a URI on at least one of the digital certificate blockchain, a CRL blockchain, and a management blockchain.

14. A method of securing communication, the method comprising:

receiving, by a processor of a relying party computing system, a secure communication request from a user via a user computing device, the secure communication request including a digital certificate;

viewing, by the processor, the digital certificate of the user via a digital certificate blockchain, wherein the digital certificate is issued by a certificate authority (CA) via a CA computing system and is digitally signed by the CA using a CA private key associated with a known CA public key;

authenticating, by the processor, the user using the known CA public key;

establishing, by the processor, a secure communication with the user via the user computing device;

monitoring, by the processor, a certificate status of the digital certificate in real-time, wherein monitoring the certificate status comprises monitoring a revocation status of the digital certificate in real-time;

publishing, by the processor, an update to the digital certificate blockchain to reflect the monitored revocation status of the digital certificate;

allowing, by the processor, the secure communication request when the published update indicates the digital certificate is not revoked;

denying, by the processor, the secure communication request from the user when the published update indicates the digital certificate is revoked; and publishing, by the processor, a revocation block to a certificate revocation list (CRL) blockchain to reflect the revocation of the digital certificate;

wherein the digital certificate revocation is managed via the CRL blockchain;

wherein at least one of an updated policy, an updated relying party agreement, and an updated audit letter are managed via a management blockchain.

15. The method of claim 14, further comprising:

publishing, by the processor, a revocation block to the digital certificate blockchain to reflect the revocation of the digital certificate.

16. The method of claim 15, further comprising confirming, by the processor, destruction of the CA private key upon determining that the digital certificate has been revoked.

17. The method of claim 14, wherein the digital certificate management system is managed via the digital certificate blockchain, wherein the digital certificate blockchain is accessible to each of a relying party and the user.

18. The method of claim 14, further comprising:

storing, by the processor, a URI comprising a URL from which underlying data is retrieved.

* * * * *